US006913813B2

(12) United States Patent
Bannert

(10) Patent No.: US 6,913,813 B2
(45) Date of Patent: Jul. 5, 2005

(54) METHOD AND DEVICE FOR PRODUCING DOUBLE LABELS AND CORRESPONDING DOUBLE LABEL

(75) Inventor: Georg Bannert, Hirschhorn (DE)

(73) Assignee: Checkpoint Systems International GmbH, Hirschhorn/Neckar (DE)

(*) Notice: Subject to any disclaimer, the term of this patent is extended or adjusted under 35 U.S.C. 154(b) by 0 days.

(21) Appl. No.: 10/974,296

(22) Filed: Oct. 27, 2004

(65) Prior Publication Data

US 2005/0058799 A1 Mar. 17, 2005

Related U.S. Application Data

(63) Continuation of application No. 10/667,718, filed on Sep. 22, 2003, now Pat. No. 6,811,645, which is a continuation of application No. PCT/EP02/03198, filed on Mar. 21, 2002.

(30) Foreign Application Priority Data

Mar. 23, 2001 (DE) ........................................ 101 14 104

(51) Int. Cl.[7] ............................ B32B 27/14; B32B 3/00

(52) U.S. Cl. ...................... 428/195.1; 428/33; 428/343; 428/914; 156/249

(58) Field of Search ................................ 428/195.1, 33, 428/343, 914; 156/249

(56) References Cited

U.S. PATENT DOCUMENTS

| | | | |
|---|---|---|---|
| 3,989,575 A | 11/1976 | Davies et al. | |
| 5,466,321 A | 11/1995 | Miyaji | |
| 5,466,501 A | 11/1995 | Logan et al. | |
| 5,560,657 A | 10/1996 | Morgan | |
| 5,707,713 A | 1/1998 | Langan et al. | |
| 6,811,645 B2 * | 11/2004 | Bannert | 156/249 |

FOREIGN PATENT DOCUMENTS

| | | |
|---|---|---|
| DE | 2 063 483 | 7/1972 |
| DE | 297 00 468 U1 | 4/1997 |
| EP | 0 859 347 A1 | 8/1998 |
| FR | 2 791 455 A1 | 9/2000 |

OTHER PUBLICATIONS

International Search Report for PCT/EP02/03198 dated Dec. 9, 2002.

* cited by examiner

*Primary Examiner*—B. Shewarege
(74) *Attorney, Agent, or Firm*—Caesar, Rivise, Bernstein, Cohen & Pokotilow, Ltd.

(57) ABSTRACT

A method is provided for producing double labels (1). Two large labels (7, 9) of different size, each of the labels being detachably applied to respective carriers (11, 13) by their adhesive surfaces (35, 37), are respectively detached from their carriers (11, 13), and are adhered together by their facing adhesive surfaces (35, 37). The two labels (7, 9) are dimensioned in such a way that, for the double label, a free end (5) of the adhesive surface of one label (2) protrudes beyond the other label (3). A device for producing such double labels (1) comprises a dispenser (25) for detaching the labels (7, 9) from their carriers (11, 13) and for assembling the labels and adhering them together. The dispenser (25) has parallel dispensing edges (27, 29). The double label (1) has a fixed element, which can be written or printed on, and a free, flexible element (5) for fixing the double label (1) to an object to be labeled or to another carrier strip. The double label (1) enables high-quality goods, such as jewelry or cosmetic products, to be labeled in a very attractive and careful manner.

4 Claims, 3 Drawing Sheets

METHOD AND DEVICE FOR PRODUCING DOUBLE LABELS AND CORRESPONDING DOUBLE LABEL

CROSS-REFERENCE TO RELATED APPLICATIONS

This application is a continuation of application Ser. No. 10/667,718 (now U.S. Pat. No. 6,811,645) filed on Sep. 22, 2003 which, in turn, is a continuation of International Application No. PCT/EP02/03198, filed on Mar. 21, 2002, the disclosure of which is incorporated herein by reference.

BACKGROUND OF THE INVENTION

This invention relates to a method for producing double labels, in which two labels of unequal size, which are detachably applied by adhesive surfaces to a respective carrier, are put together and adhered to one another. The invention further relates to a device for producing double labels, comprising at least two feed devices for supplying at least one label each to a respective carrier and at least one dispensing device for detaching the labels from the carriers and for putting the labels together and adhering them to one another. The invention likewise relates to a double label produced in accordance with the previously mentioned method, preferably by means of the previously mentioned device, the double label comprising two labels of unequal size, each having an adhesive surface, with the free portion of the adhesive surface of the one label protruding past the other label.

Methods, devices and double labels of the type given above are already known from the prior art. For example, a method for producing self-adhesive double labels is described in German published patent application DE-OS 2 063 483, in which an upper label detachably affixed to a carrier tape is applied to a lower label of equal or smaller size, with the lower label likewise being detachably affixed to a carrier tape. The double label produced in this manner can then be attached to an object, or for the time being it can remain on the carrier tape of the lower label for further use. In the known method the upper and lower labels are detachably applied to a respective carrier tape which is rolled up on an unwinding device so that the labels lie on the inside and which is drawn from the unwinding device by a respective winding device. The upper labels in this case are guided over a deflection edge and brought into position for being dispensed, so that the upper labels can be adhered to the lower labels which are guided along immediately below the deflecting edge and which remain on the carrier tape for the time being.

DE-OS 2 063 483 further discloses a device for producing self-adhesive double labels, comprising an unwinding and a winding device for the lower label carrier tape, as well as an additional unwinding device and an additional winding device for the upper label carrier tape. The device further has two deflection edges, the first of which is provided to detach the upper labels from the carrier tape and the second of which is provided to detach the finished double labels from the carrier tape. The two deflection edges here are arranged one following the other in the feed direction of the carrier tapes.

Finally, self-adhesive double labels have also become known from the prior art according to DE-OS 2 063 483, which labels comprise an upper label and a lower label, the upper label adhering by its adhesive layer to the upper side of the lower label. The upper label here can be provided with an adhesive layer merely within the area of a peripheral strip. Furthermore, the upper label can be designed to be larger than the lower label, so that it partly protrudes past the same. The protruding free portion of the upper label, however, has no adhesive layer, since the upper label in this embodiment is provided with an adhesive layer only within the area of a peripheral strip. Instead, the upper label here is glued to the base label by means of an easily separable adhesive layer, so that the upper label can be easily removed if necessary. The free portion herein facilitates the removal of the upper label. In the known double label, only the adhesive surface of the lower label is used to apply the labels to the objects to be labeled. Thus, the double label according to the prior art has the disadvantage that although it can be securely affixed to the objects to be labeled, there is no secure and inseparable bond between the upper and the lower labels. Furthermore, even though the double label does permit a wide variety of optical effects, it is not so well suited for quality items such as jewelry and cosmetics, since the entire adhesive surface of the lower label adheres to the goods. This is viewed as being unsightly and impractical.

Furthermore, German utility model application DE 297 00 468 U1 discloses a label in which a sticker is adhered to a planar carrier. The sticker herein has a first field on which, for example, the price of the goods to be marked can be printed, and a larger second field, both of which fields have a self-adhesive back. After the sticker is removed from a protective foil the first field is folded along a boundary line between the first and the second fields, and it is stuck by its back onto the back of the second field. The sticker is then adhered to the carrier with the remaining self-adhesive surface of the back of the second field. The printed first field herein remains visible through a window in the carrier. However, this known label can only be fully assembled manually and in a relatively complicated manner, for which reason it cannot be produced in a cost-effective and simple process.

BRIEF SUMMARY OF THE INVENTION

Therefore, it is an object of the present invention to create a method and a device for the simple and inexpensive production of a double label in which a very strong bond exists between the two labels and which is also suitable for marking quality items.

In accordance with the invention the object is accomplished by a method of the type given above, in which the two labels are detached from their respective carriers and are adhered to one another by means of adhesive surfaces facing each other. In this manner a strong and virtually inseparable bond occurs between the two labels. The method of the invention further has the advantage that conventional labels that are detachably applied to respective carriers can be joined to form a sturdy double label. No preparation of special preliminary label stages or modification of existing labels is required here. Adhering two labels of unequal size using the method of the present invention yields a double label having a rigid portion which, for instance, can be written or printed upon. In addition, it can also be applied or adhered by its free, more flexible segment to an object to be labeled or to a carrier tape. Thus, the method can be employed not only in a labeling process, but also in the manufacture of double labels.

In an advantageous embodiment of the method of the present invention it is provided that the labels are detached from the carriers by at least one dispensing device. They are adhered together directly following the dispensing device, and they are subsequently dispensed onto an object to be labeled or onto a further carrier. A method of this type has the advantage that the two individual labels forming the double label can be simultaneously detached from the carriers and combined to form a double label in one step. Thus, the method of the present invention is especially quick and economical. The already finished double label can then either be dispensed directly onto an object to be labeled, or it can be dispensed onto another carrier. In the latter alternative, the result is an independently marketable product which can be provided, for example, to mark prices using hand-held labeling devices.

In a further embodiment of the method according to the present invention it is provided that the carriers are carrier tapes, each of which is drawn from an unwinding roller and is guided over a dispensing edge to detach the labels. In this connection, in a preferred embodiment of the present invention, at least two carrier tapes and at least two unwinding rollers are used. Here, the carrier tape with labels on the inside is drawn from the one unwinding roller and the carrier tape with labels on the outside is drawn from the other unwinding roller. Thus, the carrier tapes run toward each other at the dispensing edge and the labels are put together with adhesive surfaces facing one another. Therefore, the method of the present invention can advantageously be performed through modification of already existing machines or labeling devices. The desired result here can be achieved through the orientation of the labels and the appropriate guiding of the carrier tapes.

Because the carrier tapes run toward each other at the dispensing edge, they are drawn from the dispensing edge parallel and in close proximity to one another. This makes it possible to wind up the two carrier tapes on a common winding roller. In this way the method can be further simplified and, moreover, the necessary equipment can be reduced.

To ensure a strong and uniform adhesion of the labels, in an advantageous embodiment of the invention, it is provided that the labels are guided through between two pressure rollers following the dispensing device.

The method of the invention results in an advantageous double label of the type given above, in which two individual labels are adhered to one another, with the adhesive surfaces facing each other. Thus, the double label of the invention is virtually divided into two areas, in which one area comprises two labels stuck together, while the other area is a free, non-adhered portion of a label of which the adhesive area is available for future use. The area comprised of two labels stuck together is very sturdy and has no adhesive surface on its upper side. This means that this area on the upper side can be written or printed upon. The non-adhered portion is more flexible and serves for attachment to objects to be labeled or to another carrier. The double label according to the invention is particularly suitable for marking quality articles such as jewelry or cosmetics, on which a label attached by its entire surface would seem disturbing and unattractive. The label's shape here can be selected so that only a slight portion of the entire double label adheres to the object to be labeled, while the double portion is for inscription. In this manner quality goods can be labeled very attractively and sparingly.

In a particularly advantageous embodiment of the invention, it is provided that the one label has a larger adhesive surface than the other label, and it protrudes with its free portion past the other label at one segment of a peripheral area. The remaining adhesive surface of the one label adheres to the adhesive surface of the other label. In this case, the free portion of the one label preferably has a lesser width than the adhered area of the double label, so that the adhered area of the double label basically stands out flag-like in relation to the free label portion applied to the object to be labeled. This results in a particularly attractive form of the double label, so that quality items can also be labeled with a correspondingly high-quality label. To be sure, the purpose of the free portion of the one label is ultimately its attachment to the objects to be labeled. However, it can also be detachably adhered temporarily to a carrier. This permits the labels to be supplied in this form for future use, for instance in a labeling machine.

The object given above is further accomplished by a device of the type given at the beginning, in which the dispensing device has dispensing edges lying parallel and adjacent to one another. This particular embodiment of the dispensing device permits the simultaneous, parallel detachment of the two labels, so that they can be put together and adhered to one another immediately following the two dispensing edges. The removal of the individual labels and their combination to form the finished double label can be accomplished virtually in one step through the arrangement of the dispensing edges. By this means the device according to the invention can also be used, for example, as a hand-held labeling device.

In a preferred embodiment of the device according to the invention it is provided that the feed devices are unwinding rollers and the carriers are carrier tapes. One of the unwinding rollers here serves to accommodate one of the carrier tapes with first labels lying on the inside, and the other unwinding roller is provided to accommodate the other carrier tape with second labels lying on the outside. The unwinding rollers are advantageously arranged in such a manner that the first labels on the one carrier tape are fed to the one dispensing edge, and the second labels on the other carrier tape are fed to the other dispensing edge on mutually opposing sides, so that the labels at the dispensing edges are arranged with their adhesive surfaces facing one another. The different manner in which the carrier tapes provided with labels are wound up and the corresponding arrangement of the unwinding rollers make it possible for the mutual adherence of the labels by their adhesive surfaces to be accomplished with low equipment requirements. Therefore, the device according to the invention can also be produced by simple modification of existing devices or designed as an addition to such devices.

As a particularly advantageous embodiment of the device according to the invention, a common winding roller can be provided to wind up the two carrier tapes from the unwinding rollers. Here it is particularly advantageous, and it is provided in a preferred embodiment, that the winding roller is arranged between the two unwinding rollers. Through this arrangement a very compact design and thus a reduction of the required space is possible. This is of particular advantage if the device according to the invention is designed as a hand-held labeling device. For the device of the invention can be used not only as a labeling device for directly marking objects to be labeled, but also as a machine for the production of double labels, which are applied to a carrier tape and provided for later use. In the second embodiment a third unwinding roller is advantageously provided to accommodate an empty carrier tape. The finished double labels can then be dispensed onto this empty carrier tape, the result being an independently marketable product.

To ensure a strong and uniform adherence of the two labels to form a double label, it is provided in a further embodiment of the device of the invention that at least two pressure rollers are arranged following the dispensing device.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
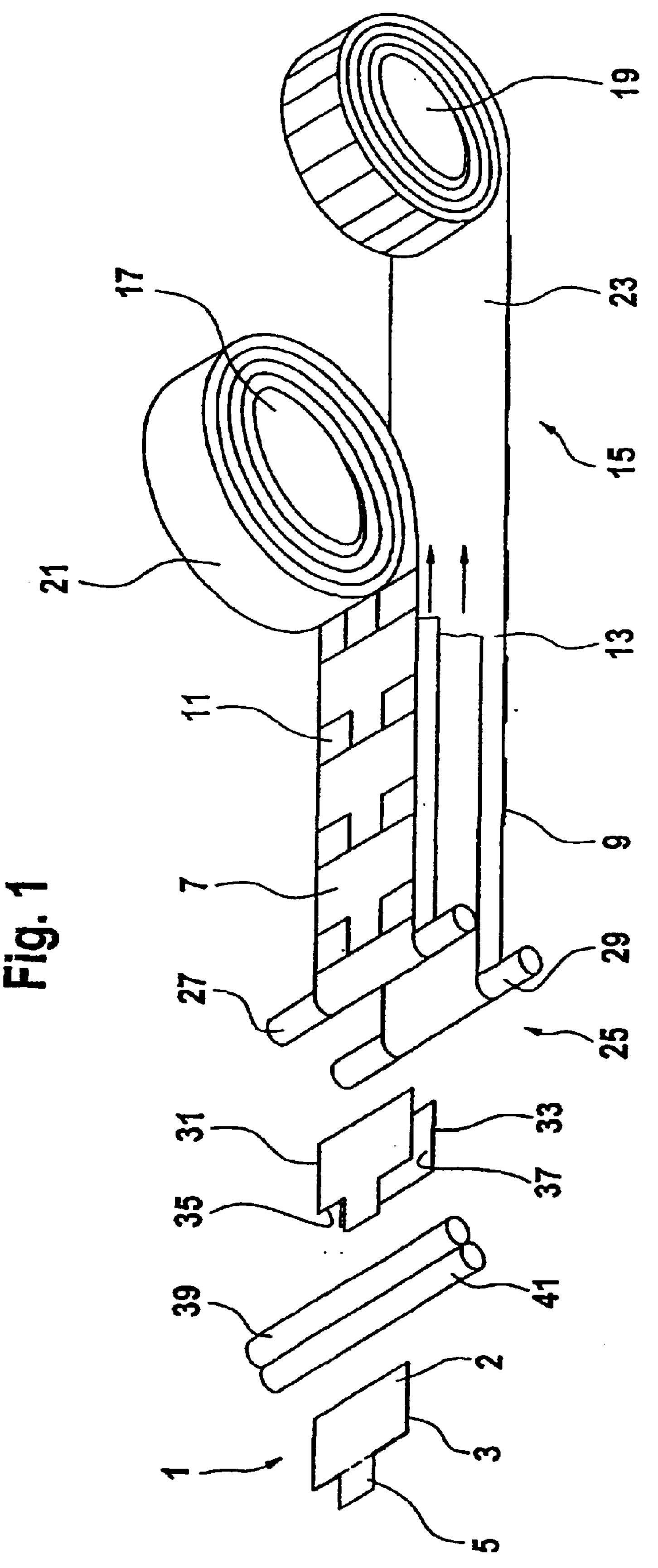
FIG. 1 is a perspective view of individual components of a device of the invention for performing the method of the invention.

FIG. 1 shows individual components of the device according to the invention, for performing the method according to the invention, and it shows a finished double label 1. The double label 1 comprises two individual labels 2, 3 of unequal size, wherein a free portion 5 of the adhesive surface of the one label 2 projects beyond the other label 3. The two labels 2, 3 are adhered together with adhesive surfaces which face each other. Within the device for producing the double labels, i.e., in the initial state, the labels 7, 9 are arranged on respective carriers 11, 13. Furthermore, the device according to the invention has two feed devices which, in the present embodiment, are comprised of the unwinding rollers 17, 19. Here the carriers 11, 13 of the labels 7, 9 are carrier tapes 21, 23, respectively, which are rolled up on the unwinding rollers 17, 19. In this case, the one carrier tape 21 is rolled up with its labels 7 lying on the inside, and the other carrier tape 23 is rolled up with its labels 9 lying on the outside, on the respective unwinding rollers 17, 19. During the production of the double labels, the carrier tapes 21, 23 in the present embodiment are drawn clockwise from the respective unwinding rollers 17, 19. The unwinding rollers 17, 19 here can either be arranged side by side or one following the other in relation to the direction of removal. The labels 7, 9 are fed from the unwinding rollers 17, 19 to a dispensing device 25, with the carrier tapes 21, 23 running toward each other at the dispensing device 25. The carrier tapes 21, 23 are subsequently each guided away from the dispensing device 25 in a direction opposite the direction of feed. In this, they can be rolled up either on separate winding rollers or on a common winding roller. This is not shown here.

The dispensing device 25 is comprised of two dispensing edges 27, 29 lying parallel and adjacent to one another, at which edges the labels 7, 9 are detached from the carrier tapes 21, 23. In this embodiment the first labels 7 on the carrier tape 21 are fed to the dispensing edge 27 from above, and the second labels 9 on the carrier tape 23 are fed to the dispensing edge 27 from below. Due to this feed of the labels 7, 9 from opposite sides, the labels 7, 9 at the dispensing edges 27, 29 are arranged with their adhesive surfaces facing each other. This is again made clear at the labels designated 31, 33 in the interim stage, i.e. in the detached state. These labels are arranged with their adhesive surfaces 35, 37 facing each other, and they are stuck together immediately after being detached from the carrier tapes 21, 23. The adhesion or the completion of the adhesion process can be accomplished, for example, by guiding the labels 31, 33 between two pressure rollers 39, 41.

Through the special arrangement of the components of the device according to the invention shown here, the double labels 1 of the invention can be produced in a particularly advantageous manner using the method of the invention. For example, the device shown here can be designed in the form of a hand-held labeling device by which the double labels 1 can be directly applied to the object to be labeled. However, it is also possible to apply the finished double labels 1 to an additional carrier tape, to attain an independently marketable product in this manner. This alternative embodiment is further represented in FIG. 2.

Figure 2:
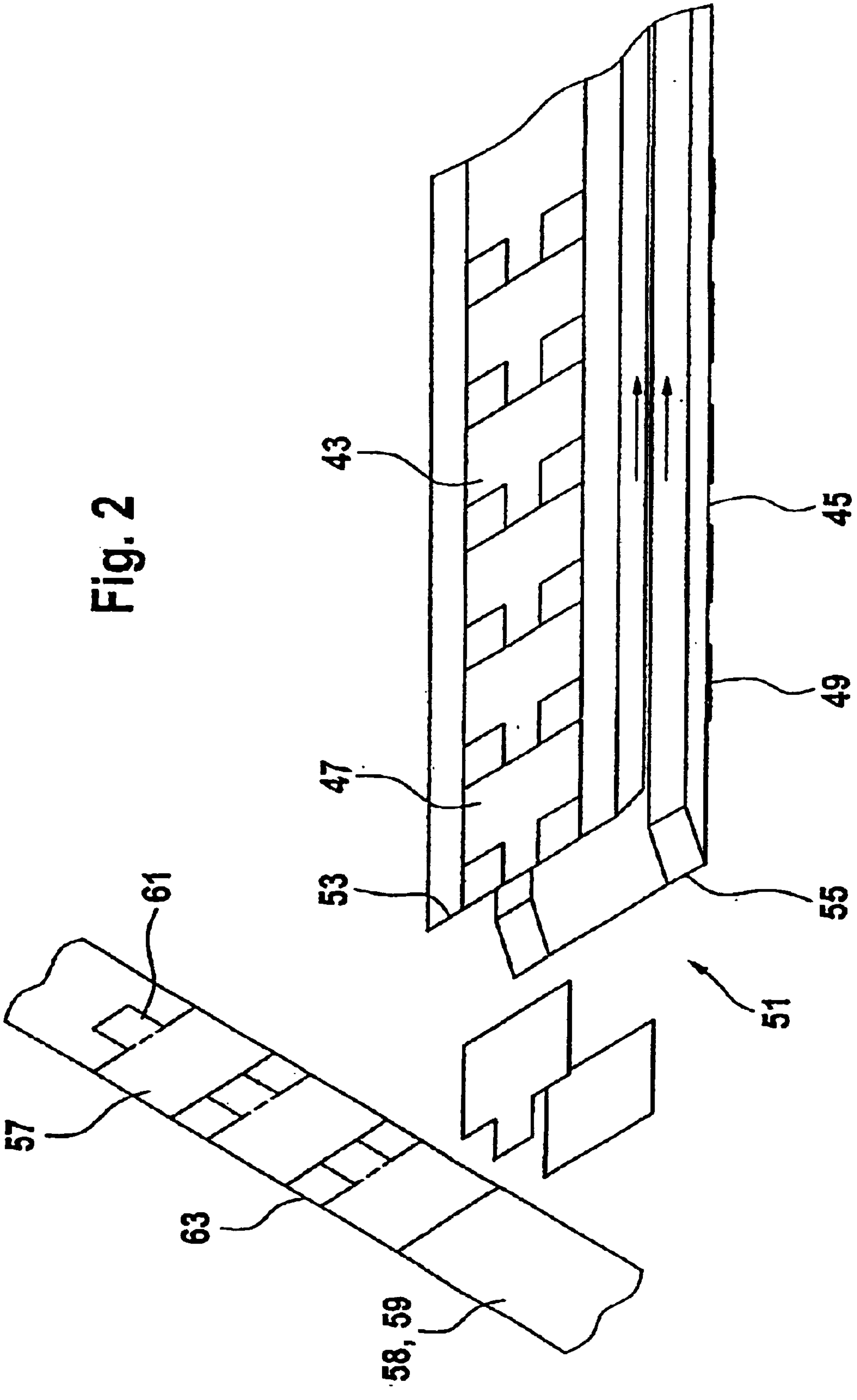
FIG. 2 is a perspective view of a further embodiment of a device according to the invention.

FIG. 2 shows a detail of a device according to the invention, having labels 47, 49 applied to two carrier tapes 43, 45. The labels 47, 49, as already depicted in and explained with reference to FIG. 1, are fed from opposite sides on the respective carrier tapes 43, 45 to the dispensing device 51. The dispensing device 51 here also comprises two dispensing edges 53, 55 lying parallel and adjacent to one another. Additionally to FIG. 1, the double labels 57 finished here are fed to an additional carrier 58 in the form of a carrier tape 59, to which they are adhered by the available free adhesive surface 61. In this manner an independently marketable endless strip 63 of double labels 57 can be produced with the device according to the invention.

Figure 3:
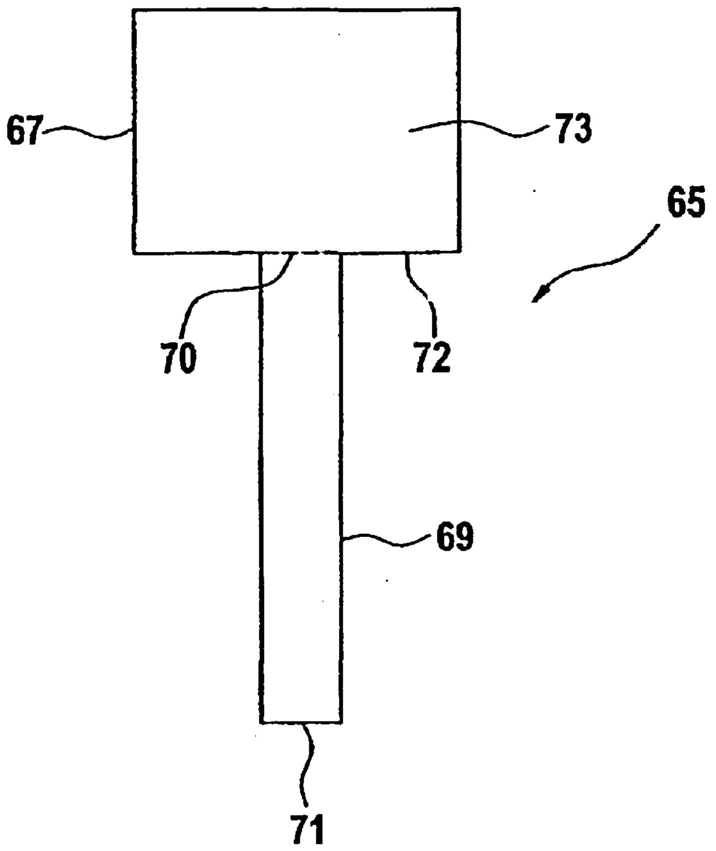
FIG. 3 is a plan view of the upper side of a label of the invention.

FIG. 3 shows a plan view onto a double label 65 according to the invention, which is comprised of the larger first label 67 that is visible here and a second label that is not visible here. The adhesive surfaces of both labels face each other and adhere together. The first label 67 here is larger than the second label and in particular has a larger adhesive surface. The free portion 69 of the adhesive surface 71 of the first label 67 projects past the other label at a section 70 of the peripheral area 72. The free portion 69 of the first label 67, which projects beyond the other label, is smaller in width than the adhered area 73 of the double label 65, which yields a flag-like shape. Whereas in the double label 65 the purpose of the free portion 69 with its adhesive surface 71 is to stick the double label 65 onto the article, the glued-together area 73 of the double label 65 serves solely for inscription. This special form of the double label 65 results in a very attractive label, with which quality goods can also be elegantly and at the same time sparingly labeled, since the entire label does not have to adhere to the quality goods.

Figure 4:
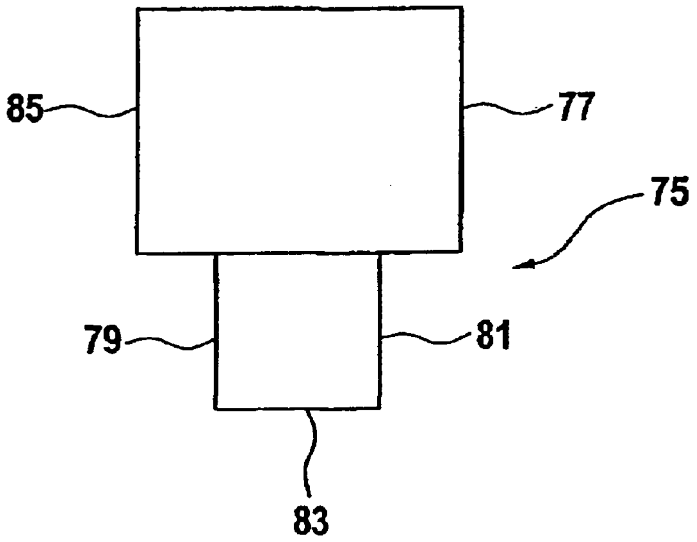
FIG. 4 is a plan view of the underside of another label according to the invention.

FIG. 4 shows a plan view onto the lower side of another double label 75 according to the invention. Like the label shown in FIG. 3, this double label 75 also has an adhered area 77 serving solely for the inscription. The first label 79 protrudes with the free portion 81 of its adhesive surface 83 beyond the second label 85. Here, too, the free portion 81 is smaller in width than the adhered area 77 of the double label 75. Here, too, a more or less flag-like double label 75 is depicted, in which the free portion 81 of the adhesive surface 83 serves solely for application to the article, while the adhered area 77 of the double label is available for being written or printed upon. Of course, the label according to the invention is not restricted to the forms represented here, but rather, any forms adapted to the user's needs or to the product requirements can be selected within the scope of the present invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A double label (1,57,65,75) comprising two labels of unequal size, each label having an adhesive surface, wherein a free portion of the adhesive surface of one of the two labels protrudes beyond another of the two labels, and where the two labels (2,3,7,9,31,33,47,49,67,79,85) are adhered together with their adhesive surfaces (35,37) facing each other, said adhesive surfaces forming a substantially inseparable bond between said labels said double label being formed by; supplying said two labels (2,3,7,9,31,33,47,49,67,79,85) of unequal size and wherein each or said two labels are detachably applied by adhesive surfaces (35,37) to respective carriers (11,13); detaching said two labels from their respective carriers, and placing and adhering said two labels together with said adhesive surfaces facing each other.

2. The double label according to claim 1, wherein the one label (2,67,79) has a larger adhesive surface (71,83) than the other label (3,85), wherein the one label protrudes with its free portion (69,81) beyond the other label (3,85) at one segment (70) of a peripheral area (72), and wherein a remaining adhesive surface of the one label adheres to the adhesive surface of the other label.

3. The double label according to claim 2, wherein the free portion (5,69,81) of the one label (2,67,79) has a lesser width than an adhered area (73,77) of the double label (1,65,75).

4. The double label according to claim 2, wherein the free portion (5,69,81) of the one label (2,67,79) is detachably adhered to a further carrier (58) and/or is provided for attachment to objects.

* * * * *